United States Patent Office 3,215,811
Patented Nov. 2, 1965

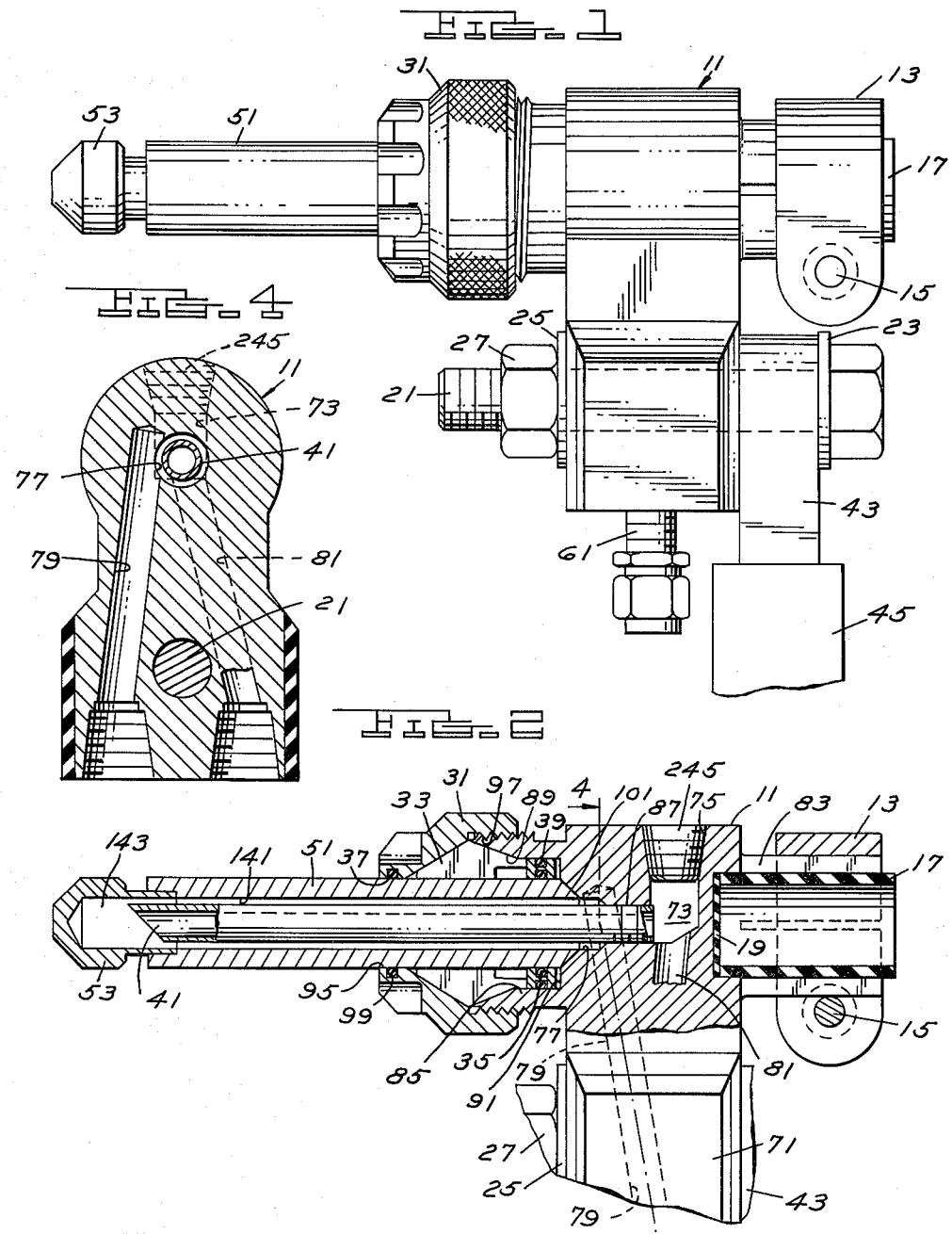

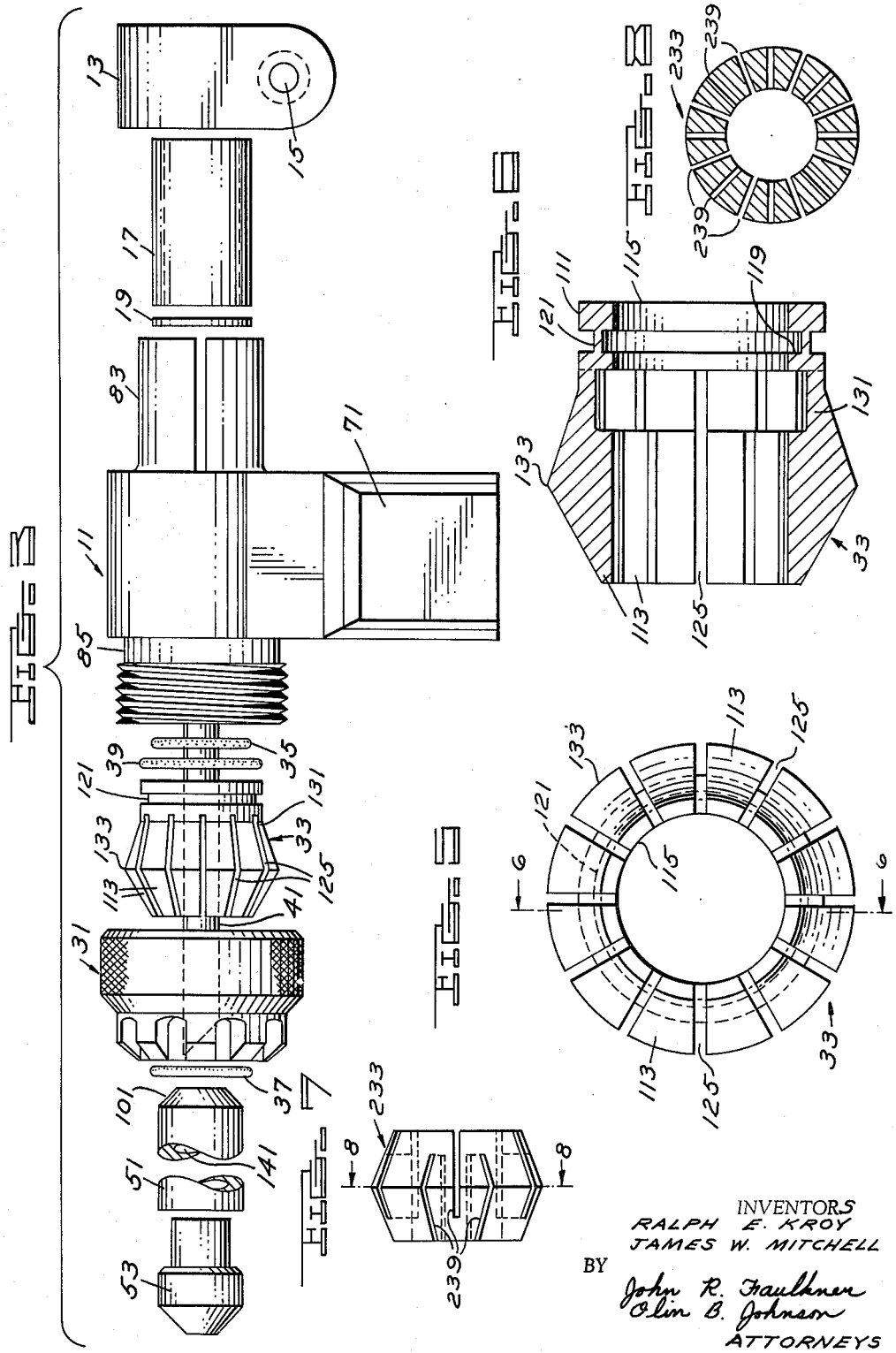

3,215,811
ELECTRODE HOLDER ASSEMBLY
Ralph E. Kroy and James W. Mitchell, Detroit, Mich., assignors to The Ford Motor Company, Dearborn, Mich., a corporation of Delaware
Filed July 1, 1963, Ser. No. 291,940
1 Claim. (Cl. 219—120)

This invention relates to electrode holders for use in spot welding and has as its principal object the provision of an improved fluid-cooled electrode holder assembly that permits electrode change with all parts of the holder apparatus in assembly.

Another object of this invention relates to provision in an electrode holder assembly of a tubular, current carrying collet of unitary construction adapted to be compressed within the holder assembly through interaction of other components of the assembly so as to firmly embrace and position an electrode extending therethrough and to release such electrode when the pressure thereon is released.

Still another object of this invention relates to provision in an electrode holder assembly of a tubular, current carrying collet of unitary construction having a rigid base defining an orifice of fixed diameter and a plurality of compressible jaws forming a mouth of variable diameter.

These and other objects and advantages of this invention will become apparent to those skilled in the art after a consideration of the following description of a preferred embodiment in which reference will be had to the drawings appended hereto, in which:

FIGURE 1 is a side elevational view of an electrode holder assembly embodying the principles of this invention with a removable electrode secured therein, FIGURE 2 is a partial side view of the holder assembly of FIGURE 1 in partial cross section taken along the longitudinal axis of the assembly, FIGURE 3 is an exploded view of the electrode holder shown in the preceding figures, FIGURE 4 is a sectional view taken along line 4—4 of FIGURE 2.

FIGURE 5 is an end view of the slotted collet shown in FIGURES 2 and 3,

FIGURE 6 is a sectional view taken along line 6—6 of FIGURE 5,

FIGURE 7 is a side elevational view of a slotted, current carrying collet yieldable to circumferential pressure throughout its entire length, and FIGURE 8 is a sectional view taken along line 8—8 of FIGURE 7.

Referring now to the drawings and more particularly to FIGURES 1 to 4 inclusive, the electrode holder assembly of the preferred embodiment comprises a holder body 11, clamping means including clamps 13, clamp bolt or screw 15, insulative bushing 17 and insulative disc 19 for detachably securing the assembly to a support element and pressure source, not shown, e.g., an air or hydraulically driven piston; connecting means including bolt 21, washers 23 and 25 and nut 27 for establishing electrical connection with cable lug 43 of cable 45 which in turn is connected to a power source, not shown; and electrode embracing means including collar 31, slotted collet 33 and flexible O rings 35, 37 and 39 of rubber or like materials and a threaded coolant tube 41.

With the holder assembly there are also shown a straight shank electrode 51 having a removable cap or tip 53, and an inlet conduit 61 through which water or other fluid coolant is introduced to holder body 11 and electrode 51.

Substantially T shaped holder body 11 is of unitary construction and comprises a central portion 71 defining a chamber 73 in fluid communication with the exterior thereof through passageways 75, 77, 79 and 81; a hollow, slotted shank 83 in perpendicular relationship to said central portion and constructed and arranged to be detachably mounted with the aid of the aforementioned clamping means upon a support element which also provides the pressure necessary for welding; and a hollow shank 85 coaxial with shank 83. Holder body 11 is constructed of suitable conductive metal, e.g., a high strength copper-beryllium alloy. Shank 85 is externally threaded to receive internally threaded collar 31 and internally threaded to receive externally threaded coolant tube 41. Chamber 73 communicates with hollow shank 85 via funnel shaped passageway 77 which comprises a threaded neck portion 87 and socket 89. Socket 89 is shaped to receive the base of current carrying collet 33 but does not allow the base of the collet to rest upon ledge 91 adjacent the conical depression defined by wall 101. Socket 89 is of a size to receive substantially all of that portion of the collet extending between such base and the major transverse axis.

Substantially funnel shaped collar 31 has a minor orifice 95 and an internally threaded major orifice 97. It is preferably constructed of materials which may be classified as non-magnetic, e.g., austenitic stainless steel. Collar 31 is provided with circular groove or channel 99 positioned a short distance inside minor orifice 95 which is adapted to receive rubber O ring 37 which serves as a seal about an electrode positioned through orifice 95. The interior surface of collar 31 is sloped to make line contact with the frontal slope of collet 33 and is adapted to exert increasing pressure on collet 33 as it is rotated clockwise on threaded shank 85. The face of collar 31 is adapted to receive a conventional spanner wrench.

Referring now particularly to FIGURES 5 and 6, collet 33 is of unitary construction and comprises a rigid tubular base 111 and a plurality of pressure sensitive jaws 113 extending from said base portion. Base 111 defines a base orifice 115 of fixed diameter, said diameter being of a size admitting the passage therethrough of electrode 51. The tapered end of electrode 51 when fully home seats against wall 101 of socket 89. Base portion 111 is provided with an internally positioned circular channel or groove 119 which is adapted to receive rubber O ring 35 and an externally positioned circular channel or groove 121 which is adapted to receive rubber O ring 39. The O rings 35 and 39 serve as coolant seals and together with O ring 37 of collar 31 prevent the escape of coolant along the exterior surface of electrode 51.

Each of the compressible jaws 113 is undercut so as to have a segment of reduced thickness 131 abutting base 111 and an area of maximum thickness indicated at 133 which is intermediate to base 111 and mouth 125 and coincides with the major outside diameter of the tubular collet. The undercut permits the remainder of the interior surface of the jaw to lie flat upon an electrode. The jaws 113 form a mouth 125 coaxial with orifice 115 the size of mouth 125 when jaws 113 are not under pressure is such as to admit passage therethrough of electrode 51. Jaws 113 are adapted to firmly embrace and hold in position an electrode extending therethrough when external pressure is circumferentially applied thereto as by the action of collar 31 closing on the externally threaded portion of body 11 and to release such electrode upon a loosening of collar 31.

Referring now to FIGURES 7 and 8, a symmetrical collet 233 is of unitary construction and yieldable to circumferential pressure throughout its entire length. The exterior surface of the collet slopes longitudinally from a minimum diameter at each end to a maximum diameter at the midpoint therebetween. The thickness of the tubular wall of the collet is therefore greatest at this midpoint and decreases at a constant rate toward each end of the collet. A plurality of longitudinally extending slots 239 extending through the tubular wall are evenly spaced. Alternate members of slots 239 directly communicate with opposite ends of the collet. When collet 233 is employed as a part of the holder assembly a flexible O ring is positioned between the collet and the socket 89 occupying the space that would be occupied by base 111 of collet 33. The collets are made of a suitable high strength conductive metal or alloy which may be the same or different from the metal or metals used for the holder body. In a preferred embodiment the collet is a high strength copper-beryllium alloy containing minor amounts of silver.

Electrode 51 defines a passageway 141 which communicates with socket 143 defined by the hollow shank of tip 153. When electrode 51 is in operating position within the holder assembly passageway 141 is in fluid communication with chamber 73 via coolant tube 41 which extends into such passageway from its seat in neck 87 of passageway 77. In this embodiment a fluid coolant is introduced into passageway 81 which communicates with chamber 73. The coolant passes through tube 41 into passageway 141 of electrode 51 and socket 143 of tip 53 and leaves through passageway 79 which communicates with passageway 77. An outlet conduit, not shown, similar to inlet conduit 61 is in fluid communication with passageway 79. In this embodiment passageway 75 is closed with plug 245 but may be used for an alternate inlet when necessary or desirable.

The electrode holder assembly of this invention provides many advantages over those heretofore available to the art. One of these is the ease of electrode replacement. Electrode change can be effected without disengaging collar 31 from holder 11 by loosening the collar, removing the used electrode, inserting the new electrode and tightening the collar. The yieldable collet of unitary construction is not susceptible to collapse or misalignment of parts upon removal of an electrode as may occur with a sectional or split collet. Another advantage is obtained through placement of the flexible seals so as to avoid subjecting the seals to the direct lines of force transmitted from the actuating mechanism of the welding device to the electrode. The minimizes seal damage and consequent time loss for replacement. The design of this assembly provides a self-wiping action of the electrode surface when the electrode is inserted into the holder. Further, the seating of the entire base of the electrode in contact with the holder body minimizes electrode damage from such contact.

The invention may be embodied in other forms or carried out in other ways without departing from the spirit or essential characteristics thereof. The present embodiment of this invention as hereinbefore set forth is therefore to be considered in all respects as illustrative and not restrictive, the scope of the invention being indicated by the appended claim, and all changes which come within the meaning and range of equivalency of the claim are intended to be embraced therein.

We claim:

An electrode holder assembly for use with an electrical resistance welding machine having a movable member for transmitting pressure to a welding electrode, said assembly comprising an electrically conductive holder having a passageway therethrough and defining at one end of said passageway a chamber for receiving spring collet means and the open end of a welding electrode having a tubular shank closed at one end, means for circulating a cooling fluid through said passageway and shank, clamping means for detachably and insulatively connecting said holder to said movable member, means for transmitting an electric current to said holder, electrically conductive, tubular spring collet means of unitary construction having one end adapted to enter said chamber and a passageway of a size sufficient to permit passage of said electrode shank therethrough, and tubular cover means having an orifice of lesser diameter admitting of the passage of said electrode shank therethrough and an orifice of greater diameter adapted to engage said holder, said spring collet means comprising a rigid base defining an orifice of fixed diameter and a plurality of circumferentially arranged, radially compressible jaws extending from said base and forming a mouth of variable diameter, each of said jaws having an area of maximum thickness intermediate between said base and said mouth and undercut immediately adjacent said base so as to provide a segment of reduced thickness abutting said base thereby permitting the remainder of the interior surface of each such jaw to contact and exert pressure upon said electrode when said electrode is passed between said jaws and substantially circumferential pressure is applied to said jaws in transverse relationship to said mouth, said cover means being adapted to be secured to said holder by thread means, to enter into telescopic engagement with said holder, to hold said electrode in electrical connection with said holder and to exert a substantially circumferential pressure upon said spring means that is directly proportional to the depth of said telescopic engagement and transverse to said mouth.

References Cited by the Examiner

UNITED STATES PATENTS

| Re. 25,318 | 1/63 | Benjamin et al. | 279—47 |
| 2,322,691 | 6/43 | Hensel | 219—120 |
| 2,399,797 | 5/46 | Gross et al. | 219—120 |
| 2,683,206 | 7/54 | Day et al. | 219—120 |

FOREIGN PATENTS

| 22,384 | 4/48 | Finland. |
| 551,720 | 3/43 | Great Britain. |

RICHARD M. WOOD, *Primary Examiner.*